(12) United States Patent
Nakano et al.

(10) Patent No.: US 7,988,545 B2
(45) Date of Patent: Aug. 2, 2011

(54) GAME RESULT EVALUATING METHOD AND DEVICE

(75) Inventors: Hideyasu Nakano, Minato-ku (JP); Toyokazu Sakai, Minato-ku (JP); Takuya Kobayashi, Minato-ku (JP); Yasushi Mito, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 798 days.

(21) Appl. No.: 12/037,610

(22) Filed: Feb. 26, 2008

(65) Prior Publication Data

US 2008/0161078 A1 Jul. 3, 2008

Related U.S. Application Data

(63) Continuation of application No. PCT/JP2006/313819, filed on Jul. 12, 2006.

(30) Foreign Application Priority Data

Aug. 31, 2005 (JP) ................................ 2005-250430

(51) Int. Cl.
*G06F 17/00* (2006.01)
*G06F 19/00* (2011.01)

(52) U.S. Cl. .................. 463/7; 463/30; 463/31; 463/59; 463/60; 700/91; 700/92

(58) Field of Classification Search .......... 463/7, 59–60, 463/30, 31; 700/91–92
See application file for complete search history.

(56) References Cited

U.S. PATENT DOCUMENTS 4,164,081 A * 8/1979 Berke .............................. 434/22
5,910,046 A * 6/1999 Wada et al. ....................... 463/6
6,117,014 A * 9/2000 Aoyama et al. ................. 463/43
(Continued)

FOREIGN PATENT DOCUMENTS

EP 0 993 847 A1 4/2000
(Continued)

OTHER PUBLICATIONS

Parker Brothers, "RISK: Rules of Play," 1963.*
(Continued)

*Primary Examiner* — Peter DungBa Vo
*Assistant Examiner* — Bach Hoang
(74) *Attorney, Agent, or Firm* — Global IP Counselors, LLP

(57) ABSTRACT

Further interest after completion of a game and motivation to participate in the next game are given to players of any skill. Using the results (for example, skill points, maximum combo number) of players evaluated for each predetermined parameter in for example a music game, and players again compete against each other. In other words, after the music game a separate game (secondary game) is played. Winning or losing in the secondary game depends on the results of the players for each parameter in the primary game, and the skill of the player in the secondary game. Therefore, a player's effort and skill in the primary game can be utilized in the result of the secondary game, and even if the result of the primary game is unsatisfactory, the player can seize the chance to win the secondary game, depending on the skill of the player in the secondary game. Therefore, players of various levels of skill in the primary game are given further interest after completion of the primary game, and moreover are given motivation to compete in the primary game.

16 Claims, 16 Drawing Sheets

Secondary game results screen

U.S. PATENT DOCUMENTS

| | | | |
|---|---|---|---|
| 6,283,855 B1* | 9/2001 | Bingham | 463/12 |
| 6,425,822 B1* | 7/2002 | Hayashida et al. | 463/7 |
| 6,450,888 B1* | 9/2002 | Takase et al. | 463/43 |
| 6,656,048 B2* | 12/2003 | Olsen | 463/25 |
| 7,128,649 B2* | 10/2006 | Nobe et al. | 463/23 |
| 7,288,024 B2* | 10/2007 | Toyoda | 463/13 |
| 7,326,115 B2* | 2/2008 | Baerlocher | 463/25 |
| 7,513,824 B2* | 4/2009 | Kanno et al. | 463/6 |
| 7,582,010 B2* | 9/2009 | Takahashi et al. | 463/3 |
| 7,722,450 B2* | 5/2010 | Onoda et al. | 463/7 |
| 7,811,164 B1* | 10/2010 | Fox | 463/7 |
| 2002/0025841 A1* | 2/2002 | Nobe et al. | 463/1 |
| 2002/0025842 A1* | 2/2002 | Nobe et al. | 463/7 |
| 2002/0065125 A1* | 5/2002 | Osawa | 463/20 |
| 2002/0128736 A1* | 9/2002 | Yoshida et al. | 700/92 |
| 2003/0040364 A1* | 2/2003 | Yabe et al. | 463/43 |
| 2003/0130031 A1* | 7/2003 | Yoshida et al. | 463/23 |
| 2003/0171144 A1* | 9/2003 | Letovsky | 463/16 |
| 2004/0171414 A1* | 9/2004 | Duhamel et al. | 463/11 |
| 2005/0085284 A1* | 4/2005 | Onoda et al. | 463/7 |
| 2005/0121855 A1* | 6/2005 | Noda et al. | 273/348 |
| 2005/0151317 A1* | 7/2005 | Zajac et al. | 273/146 |
| 2005/0209717 A1* | 9/2005 | Flint et al. | 700/91 |
| 2006/0184260 A1* | 8/2006 | Graepel et al. | 700/92 |
| 2008/0102991 A1* | 5/2008 | Hawkins | 473/422 |
| 2008/0287175 A1* | 11/2008 | Kusuda et al. | 463/17 |
| 2009/0029754 A1* | 1/2009 | Slocum et al. | 463/5 |
| 2009/0137297 A1* | 5/2009 | Mukasa et al. | 463/7 |
| 2009/0239601 A1* | 9/2009 | Macke | 463/7 |
| 2010/0035689 A1* | 2/2010 | Altshuler et al. | 463/39 |

FOREIGN PATENT DOCUMENTS

| | | | |
|---|---|---|---|
| JP | 09-164272 A | | 6/1997 |
| JP | 2000-051523 A | | 2/2000 |
| JP | 2003-062348 A | | 3/2003 |
| JP | 2003144757 A | * | 5/2003 |
| JP | 2004-229848 A | | 8/2004 |
| JP | 2005319185 A | * | 11/2005 |
| JP | 2006006658 A | * | 1/2006 |
| JP | 2006014955 A | * | 1/2006 |
| JP | 2006014956 A | * | 1/2006 |
| JP | 2008188054 A | * | 8/2008 |
| WO | WO-02/21369 A1 | | 3/2002 |

OTHER PUBLICATIONS

Parker Brothers, RISK: Rules of Play For (1959).*

* cited by examiner

Individual data

| Player ID | Player name | Authorization information | Card ID | Rank | Parameter cumulative score | Secondary game cumulative score |
|---|---|---|---|---|---|---|
| P0001 | Taro Yamada | Yamada | C0001 | R1 | (80,60,60,30,50,50) | Wins 0, Losses 3 |
| P0002 | Jiro Suzuki | Suzuki | C0002 | R5 | (20,50,50,60,30,30) | Wins 3, Losses 2 |
| | | Jiro | C0020 | R6 | (90,80,40,25,70,90) | Wins 2, Losses 3 |
| ... | ... | ... | ... | ... | ... | ... |

*Fig. 9*

GAME RESULT EVALUATING METHOD AND DEVICE

TECHNICAL FIELD

The present invention relates to a game result evaluating method in which the result of a game played by a plurality of players is evaluated, and the evaluation result is displayed.

BACKGROUND ART

In recent years, it has become commonplace for the ranking of the game results of players to be displayed to other players within the country or within a store using a ranking table (Patent Document 1). Based on this table, it is expected that each player will positively compete with the aim of improving their ranking.
<Patent Document 1> Japanese Patent Application Laid-open No. 2000-51523

DISCLOSURE OF THE INVENTION

However, although this may not apply to the out of the ordinary players, for average and below average players, the absolute evaluation of their game results may be a factor to conversely reduce their motivation for competition. If only the outstanding players occupy the top ranks, the interest of the many other players will diminish, and the ranking which was intended to stimulate the motivation of the players will have the opposite effect. On the other hand, if unskilled players can easily rise in the rankings, the motivation for competition of the highly skilled players will be reduced.

In other words, what is required is a ranking that rewards the past efforts and results of skilled players by increasing the opportunities for higher ranking the better the game results. At the same time, giving opportunities to unskilled players to improve their rank so that the ranking does not reduce the motivation for competition of these players is required.

Furthermore, although the display of ranking carried out after completion of a game may stimulate a player to improve their skills, it may not stimulate the player's motivation for continued competition. In other words, the display of ranking is nothing more than an absolute evaluation of a player based on the game result, and does not contribute interest to the game after the game is finished.

Therefore it is an object of the present invention to provide a game result evaluating method that gives to players of all kinds further interest after completion of a game as well as motivation to compete in the next game.

In order to solve this task, a first aspect of the present invention provides a game result evaluating method for evaluating a player's results for each predetermined evaluation item. The method includes the following steps.

comparing the player's results with the results of another player for each of the evaluation items, and determining the superiority and inferiority of the player for each evaluation item based on the comparison results;

displaying the determined results for each evaluation item arranged along a predetermined direction;

moving the display position of the determined results for each evaluation item and/or the display position of a predetermined reference mark along the direction of arrangement of the determined results, so that the arrangement of determined results is circulated relative to the reference mark;

receiving from a player an instruction at a timing that the reference mark is positioned at one of the determined results while being circulated in the step of moving the display position of the determined results; and determining whether a player has won or lost, in accordance with the determined result at which the reference mark is positioned at the timing of the instruction.

In the present game result evaluating method, the results of two players are compared for each evaluation item evaluated for a music game or the like. Whether a player wins or loses in the secondary game is determined based on the comparison results, so a player's results in the primary game are indirectly evaluated in the secondary game. Also, by carrying out the secondary game after the primary game, it is possible to provide the player an added value that is not limited to simply evaluating the results of the player in the primary game, in other words the enjoyment of a separate game.

Winning or losing in the secondary game is based on superiority or inferiority for each evaluation item in the primary game. Determination of superiority or inferiority may be carried out for the results for each evaluation item as they are, or by comparing the results for predetermined comparison items that combine evaluation items. In the case of the latter also, the evaluation items in the primary game indirectly determine the superiority or inferiority. In determining the winner and loser based on the results of the determination of superiority or inferiority, it is clear to the players that there is not even a small amount of intervention by the computer. Therefore, the players can readily accept the win or loss in the secondary game. Furthermore, even if just looking at the determination results based on the comparison items shows many defeats, a player can aim for a favorable determination result by using their skill. This is because the incentive of "reward for the effect of effort" is given to the player. For example, even when there is only one "Win" item among N evaluation items, a player that is successful in targeting the one "Win" item can win the secondary game. Conversely, there is a high possibility that a player with a good result in the primary game will have many "Wins" in the determination results, so it is possible to increase the success rate in the secondary game.

In this way, for players of all skills, winning or losing in the secondary game does not depend on the game device, but there is scope for determining the result by their own skill, so the players can accept the results obtained. On the other hand, winning or losing in the secondary game is a reflection of both the player's results in the primary game and the players' skill in the secondary game, so the result is that both the motivation in the primary game, which is necessary for the secondary game, and interest in the secondary game are stimulated.

The display position of the determined results is preferably circulated by repeatedly shifting the display position of the determined results for each evaluation item one at a time along the direction of arrangement of the determined results and re-displaying the determined results.

For example, in the case where the determined results are displayed as cards arranged in a horizontal row, the cards are shifted either to the left or to the right one at a time. In the case where they are shifted to the right, when a card is moved as far as the right end, next the card is moved to the left end, on the opposite side, and again the card is shifted one at a time to the right. By repeating this, the horizontal row arrangement circulates to the right at a constant velocity. The reference mark may be displayed at a predetermined position, for example a fixed position at the card that is third from the left. Also, the reference mark may for example be moved at a constant speed in the opposite direction to the determined results. By doing this, the reference mark and the array of determined results circulate relative to each other, at a constant relative circulation speed. If the relative circulation speed is constant, a player can easily aim for a determination result that is favorable.

Various other forms can be considered for the form of display of the determined results. For example, in the case where the determined results are displayed as cards arranged in a ring shape, the cards are shifted either clockwise or counterclockwise one at a time. Also, for example, in the case that the determined results are displayed as cards arranged in a vertical row, the cards are circulated downwards by repeatedly moving the cards from top to bottom, and when the bottom end is reached the card is displayed at the top end, or circulating in the opposite direction. In this way, the circulation direction and the circulation form of the determined results array are varied in accordance with the display form.

The reference mark is preferably circulated along the direction of arrangement of the determined results for each evaluation item in the step of moving the display position.

For example, in the case where the determined results are displayed as cards arranged in a horizontal row, the reference mark is shifted either to the left or to the right one at a time. In the case where the reference mark is shifted to the right, when the reference mark is moved as far as the right end, next the reference mark is moved to the left end, on the opposite side, and again the reference mark is shifted one at a time to the right. By repeating this, the reference mark circulates to the right along the horizontal row arrangement. At this time, the determined results array may be stopped and not circulate, or for example may circulate at a constant speed in the opposite direction to the reference mark. By doing this, the reference mark and the array of determined results circulate relative to each other at a constant relative circulation speed. If the relative circulation speed is constant, a player can easily aim for a determined result that is favorable.

For example, in the case where the determined results are displayed as cards arranged in a ring shape, the reference mark is shifted either clockwise or counterclockwise. Also for example, in the case where the determined results are displayed as cards arranged in a vertical row, the reference mark circulates either downwards or upwards. In other words, the reference mark circulates along the array of determined results, in a path and direction corresponding to the display form of the determined results.

The results of the other player for each evaluation item may be received from a computer terminal via a network in the step of determining the superiority and inferiority.

The game terminal device that executes the present game results evaluation method is connected to a center server via a network. The center server collects and stores player individual data, for example, the results of each evaluation item in the primary game, and authorization information. After execution of the primary game is finished, the game terminal device receives a part of the individual data of another player in response to a request to the center server. In this way, after completion of the primary game, players can enjoy the secondary game with other players that exist over a wide area, based on the results of their own game.

The determined result is preferably displayed as either a first value or a second value in the step of displaying the determined results.

For example, by displaying the two values "Win" or "Lose", a player can tell at a glance whether "Win" or "Lose" is more frequent, and can easily determine whether the situation is advantageous or not. Also, by providing two values for the determined results, a player can easily distinguish favorable combinations from among the combinations of circulating determined results and reference mark.

The step of displaying the determined results preferably displays the determined result as either a first value or a second value in. The step of moving the display position preferably adds the first value and the second value in equal numbers to the arrangement of determined results for each evaluation item to form a composite arrangement, and circulates the composite arrangement and the reference mark relative to each other.

For example, the first value may be taken to be "Win", and the second value may be taken to be "Lose". Even if a player has lost all the evaluation items evaluated in the primary game, because N (where N is a natural number) displays of "Win" and "Lose" each are added, the player is given a definite chance to win. In other words, by aiming for the "Win", the player can aim for a reversal in the secondary game at one stroke. This means that depending on the player's skill, the player can achieve a win in the secondary game by coming from behind. In other words, even a player with poor skill in the primary game has the possibility of winning in the secondary game by skillfully aiming for a "Win" in the secondary game.

Of course, if a player achieves an excellent result in the primary game, the possibility of achieving "Win" in each comparison item is increased, so the chances of winning in the secondary game are increased. Therefore, players will give their best from the primary game stage, in order to increase the chances of winning in the secondary game. As a result, if a player gets a favorable determination result in the secondary game, the player can enjoy the feeling of satisfaction that their efforts in the primary game have been rewarded.

The result of this is that the determination, appetite for promotion, and competitive motivation are stimulated up one level for both players with high skill and those without high skill.

The first value and the second value are preferably displayed in mutually different display formats in the step of displaying the determined results and the step of moving the display position.

For example, by displaying "Win" and "Lose" in different colors respectively, a player can easily distinguish between "Win" and "Lose" among the circulating values. Therefore a player can be given a chance of winning, and the competitive motivation of the players raised.

Another aspect of the present invention provides a game result evaluating device that evaluates a player's results for each predetermined evaluation item. The device includes the following units.

determining unit for comparing the player's results with the results of another player for each of the evaluation items, and determining the superiority and inferiority of the player for each evaluation item based on the comparison results;

results display unit for displaying the determined results for each evaluation item arranged along a predetermined direction;

circulating unit for moving the display position of the determined results for each evaluation item and/or the display position of a predetermined reference mark along the direction of arrangement of the determined results, so that the arrangement of determined results is circulated relative to the reference mark;

instruction receiving unit for receiving from a player an instruction at the timing that the reference mark is positioned at one of the determined results while being circulated by the circulation unit; and win or lose determining unit for determining whether a player has won or lost, in accordance with the determined result at which the reference mark is positioned at the timing of the instruction.

This game results evaluation device has the same operation and effect as the first invention.

Another aspect of the present invention provides a computer product executed by a computer for evaluating the results of a player for predetermined evaluation items. This program causes the computer to control an execution of the steps of the first aspect of the invention.

The method executed by this program has the same operation and effect as the first aspect of the present invention.

According to the present invention, winning or losing in the secondary game is a reflection of both the player's results in the primary game and the players' skill in the secondary game, so the result is that both the motivation in the primary game, which is necessary for the secondary game, and interest in the secondary game are stimulated.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

FIG. 9 is an outline explanatory diagram of the individual information stored on the center server shown in FIG. 8;

BEST MODE FOR CARRYING OUT THE INVENTION

<Outline of the Invention>

In the game result evaluating method according to the present invention, the players are made to confront each other again using the players' results evaluated for each predetermined parameter (corresponding to evaluation items) during execution of various types of games. In other words, after each game (hereafter referred to as a primary game) another game (hereafter referred to as a secondary game) is carried out. In the primary game, the players' results are evaluated for each predetermined comparison item, based on the parameters of the primary game. Victory or defeat in the secondary game depends on the results for each parameter of the players in the primary game, and the players' skill in the secondary game. Therefore, the players' effort and skill in the primary game is utilized in the results of the secondary game. In addition even if the result in the primary game is unsatisfactory, a player can be given an opportunity for victory in the secondary game, depending on the player's skill. Therefore, players of various skills whose objective is the primary game are given further enjoyment after completion of the primary game, and moreover can be given motivation to compete in the primary game.

Figure 1:
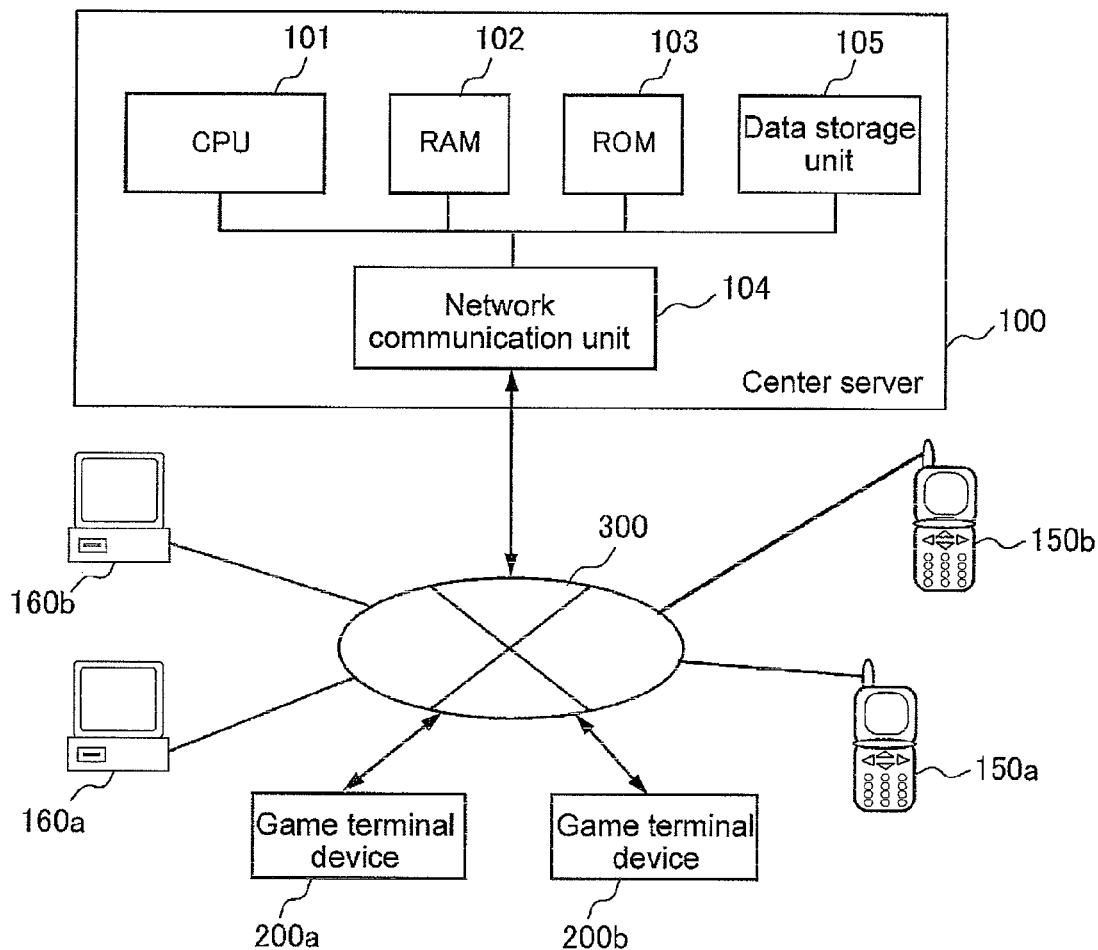
FIG. 1 is an explanatory diagram showing the overall constitution of the game system according to the first embodiment example.

First Embodiment Example (1) Constitution of the Game System According to the Present Embodiment Example FIG. 1 is an explanatory diagram showing the overall constitution of the game system according to the first embodiment example of the present invention. The game system includes a center server 100 and a plurality of game terminal devices 200a, b, . . . . The game system may also include mobile phones 150a, b, . . . or personal computers 160a, b, . . . . The game terminal devices 200, the mobile phones 150, and the personal computers 160 are connected to the center server 100 via a network 300 such as the internet or the like.

(1-1) Center Server

The center server 100 receives and records individual data for each player from the game terminal devices 200. Also, the center server 100 transmits individual data to the source of a request, in response to a request from the game terminal devices 200. The center server 100 includes the following elements (a) through (e).

(a) CPU 101: Implements a plurality of functions that are described later, based on control programs or similar stored in ROM 103 or RAM 102.

(b) RAM 102: Temporarily stores control programs, individual data, and the like.

(c) ROM 103: Stores control programs and the like.

(d) Network communication unit 104: Transmits and receives data to and from the game terminal devices 200, the mobile phones 150, and the personal computers 160 via the network 300.

(e) Data storage unit 105: Stores the individual data for each player transmitted from the game terminal devices 200. The individual data can include authorization information such as player ID, password and the like, and rank and so on. Also, in the present invention, the cumulative value of the scores for each parameter in primary games played by each player in the past, and the cumulative scores of secondary games are included in the individual data. This individual data is described in detail later.

(1-2) Game Terminal Device

Figure 2:
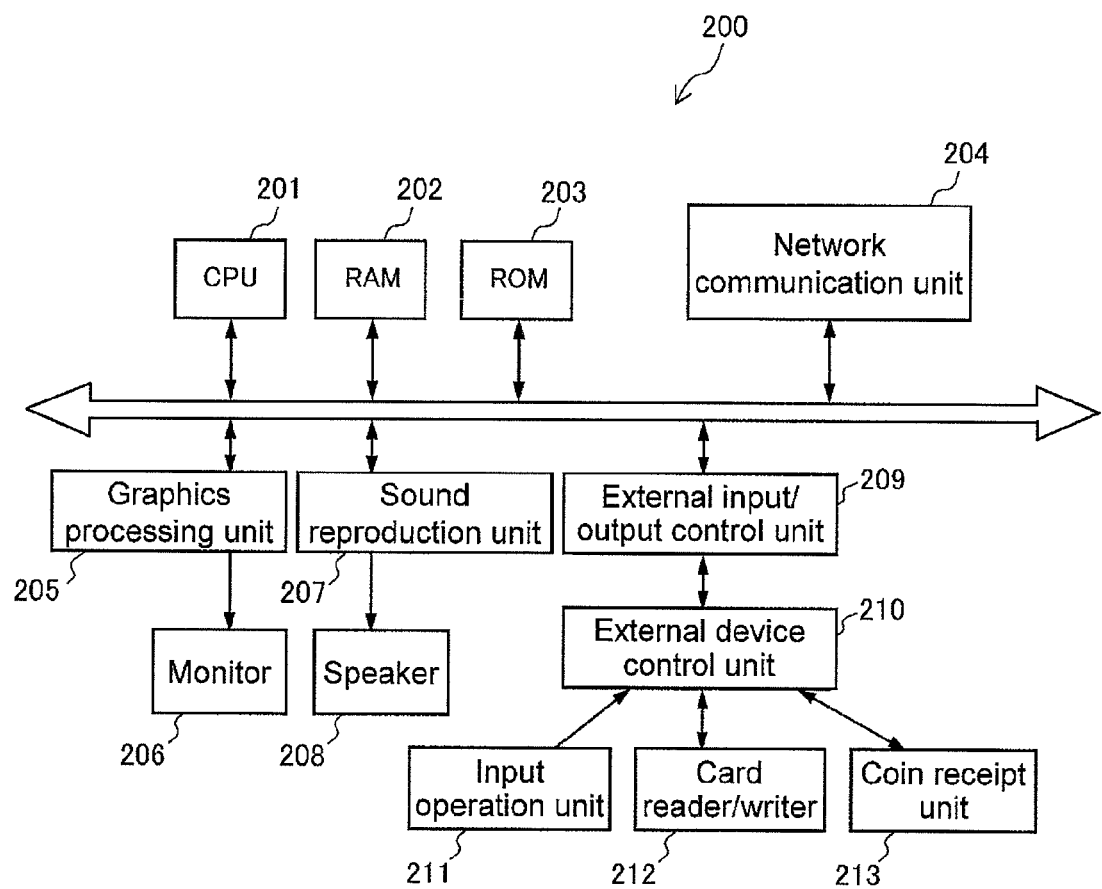
FIG. 2 is a diagram of the constitution of the game terminal device.

FIG. 2 shows an example of the constitution of the game terminal device 200. After the primary game is completed, the game terminal device 200 obtains the individual data of the other player from the center server 100. Based on the obtained individual data, the secondary game is played, and the result is displayed. The game terminal device 200 includes the following elements (a) through (m).

(a) CPU 201: Implements a plurality of functions that are described later, based on control programs or similar stored in ROM 203, which is described later, and data for primary and secondary games stored in RAM 202, which is described later.

(b) RAM 202: Temporarily stores all kinds of variables, parameters, and so on, and all kinds of data for primary and secondary games.

(c) ROM 203: Stores control programs, all kinds of parameters, and the like.

(d) Network connection unit 204: Transmits data to and receives data from the center server 100, via the network 300.

(e) Monitor 206: Displays the game images during the primary and secondary games, the results for each parameter in the primary game, the secondary game results, and so on.

(f) Graphics processing unit 205: Generates image data for display on the monitor 206.

(g) Speaker 208: Outputs sound effects and other sounds during execution of primary and secondary games, during display of demo screens, and when displaying the results of primary and secondary games, and so on.

(h) Sound reproduction unit 207: Reproduces sound data for outputting by the speaker 208.

(i) Input operation unit 211: Receives player instruction input. In the present embodiment example, a guitar controller with a shape that imitates a guitar is used, but a controller of any other shape, that imitates a drum or string instrument for example, may be used. The input operation unit 211 may include a keyboard, joystick, operation button, lever, pedal, or the like.

(j) Card reader/writer 212: Reads the card ID from an inserted magnetic card. When necessary, the card reader/writer 212 may execute a player ID or game results write process.

(k) Coin receipt unit 213: Receives credit using inserted coins.

(l) External device control unit 210: Controls external devices such as the input operation unit, card reader/writer 212, and the coin receipt unit 213.

(m) External input/output control unit 209: Generates control signals for external devices such as the input operation unit, card reader/writer 212, and the coin receipt unit 213. Also, receives detection signals from external devices and transmits them to the CPU 201.

Figure 3:
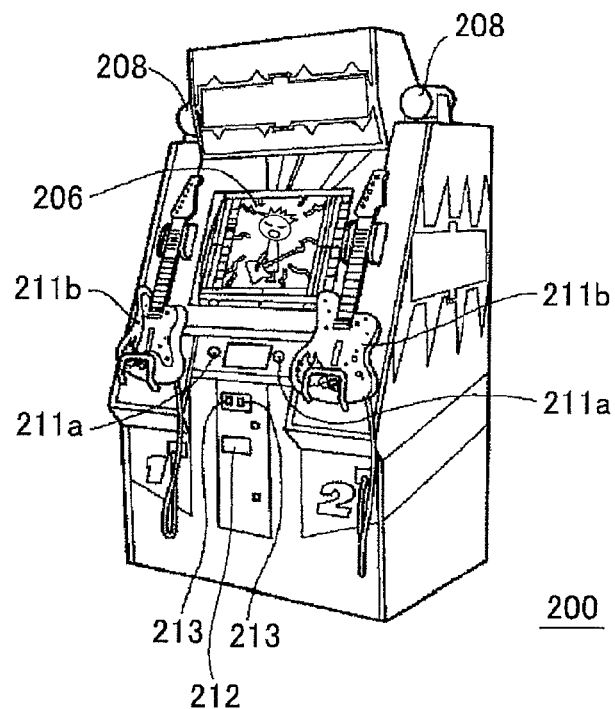
FIG. 3 is an external isometric view of a music game device as a specific example of a game terminal device.

(2) Example of Game Terminal Device (2-1) Constitution of the Game Terminal Device FIG. 3 is an external isometric view of a music game device as a specific example of the game terminal device 200. In this game terminal device 200, music games are executed as the primary games. The monitor 206 is provided in the front of the body of the music game device. Also, an input operation unit 211*a*, such as a start button and the like, is provided to the left and the right below the monitor 206, below which two coin receipt units 213 are provided to the left and right. Further, the card reader/writer 212 is provided below the coin receipt units 213. Also, on the left and right sides of the monitor 206 are mock musical instruments as input operation unit 211 with which a player inputs rhythmic music, in other words guitar controllers 211*b* are installed. Further, above the monitor 206 on top of the body, the speaker 208 is installed to output the performance effect of the tune performed. If two guitar controllers 211*b* are installed, two players can play the music game by carrying out input operations on the respective guitar controllers 211*b*.

Figure 4:
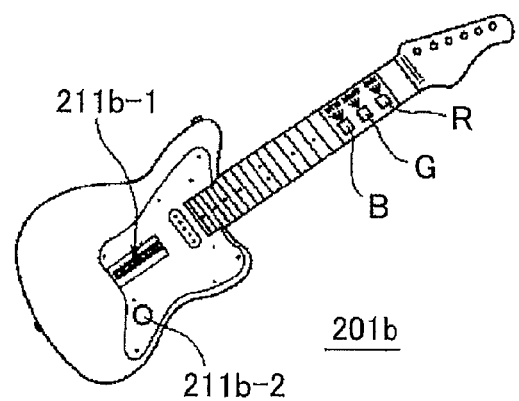
FIG. 4 is an enlarged diagram of a guitar controller.

FIG. 4 is an enlarged diagram of the guitar controller. The guitar controller 211*b* has three types of neck buttons R, G, B for selecting the type of rhythmic sounds. Also, the guitar controller 211*b* has picking input portion 211*b*-1 for determining the output timing of the rhythmic sounds selected by at least one neck button. Also, the guitar controller 211*b* has a switch 211*b*-2 for switching the output mode of rhythmic sounds, disposed below the picking input portion 211*b*-1.

(2-2) Execution of the Primary Game

In the game terminal device 200 constituted as described above, games are carried out as follows, in accordance with a control program recorded in the ROM 203. A player inserts their own magnetic card into the card reader/writer 212 and inserts a coin into the coin receipt unit 213, in the game terminal device 200. The game terminal device 200 reads the card ID to recognize the card from the magnetic card inserted into the card reader/writer 212, and requests a password to be input. The input password is compared with the data of the center server 100, and individual authorization is carried out. When an instruction to start the game is received from the player, the CPU 201 executes the control program, and the game starts.

(2-3) Outline of the Primary Game

Figure 5:
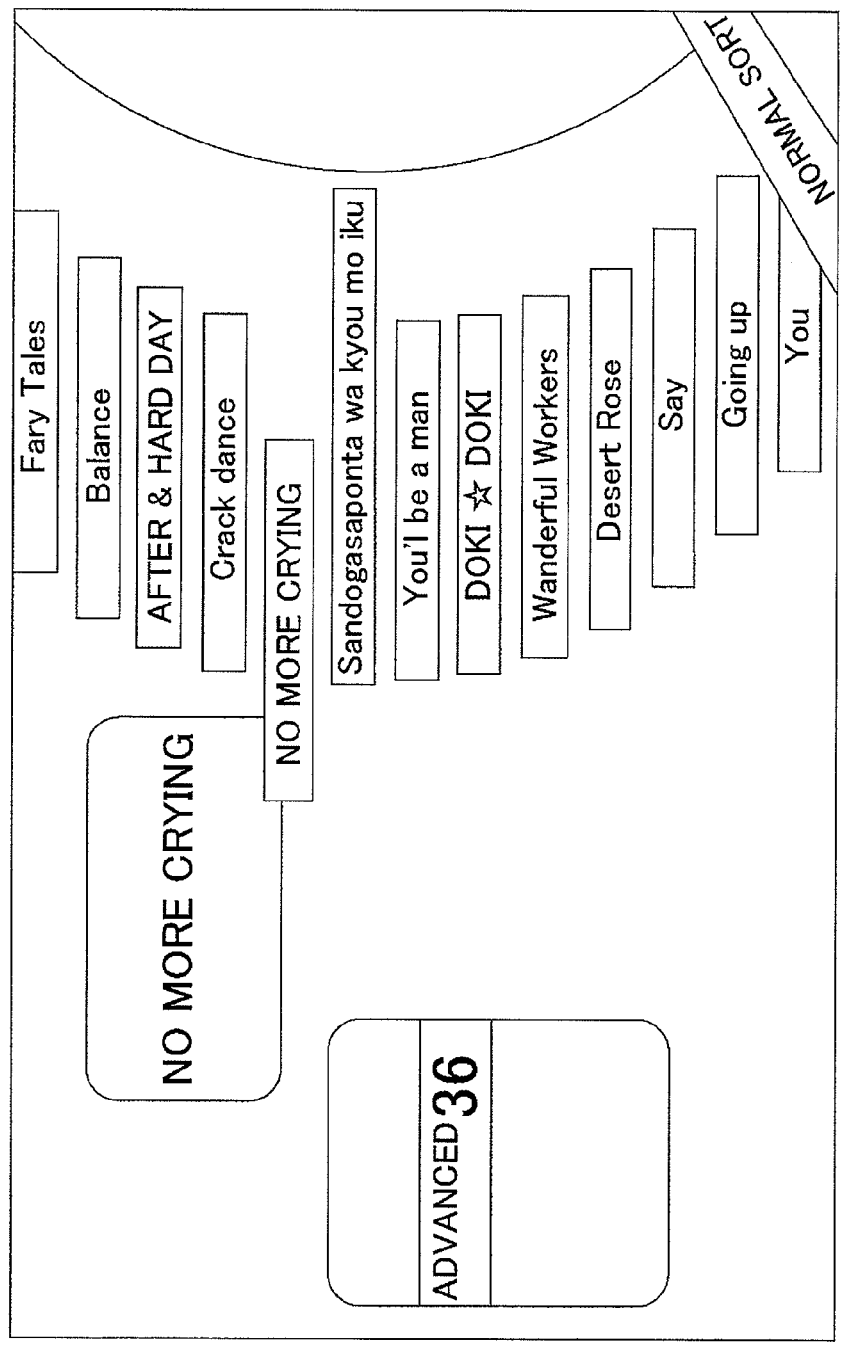
FIG. 5 is an explanatory diagram showing an example of a tune selection screen.
Figure 6:
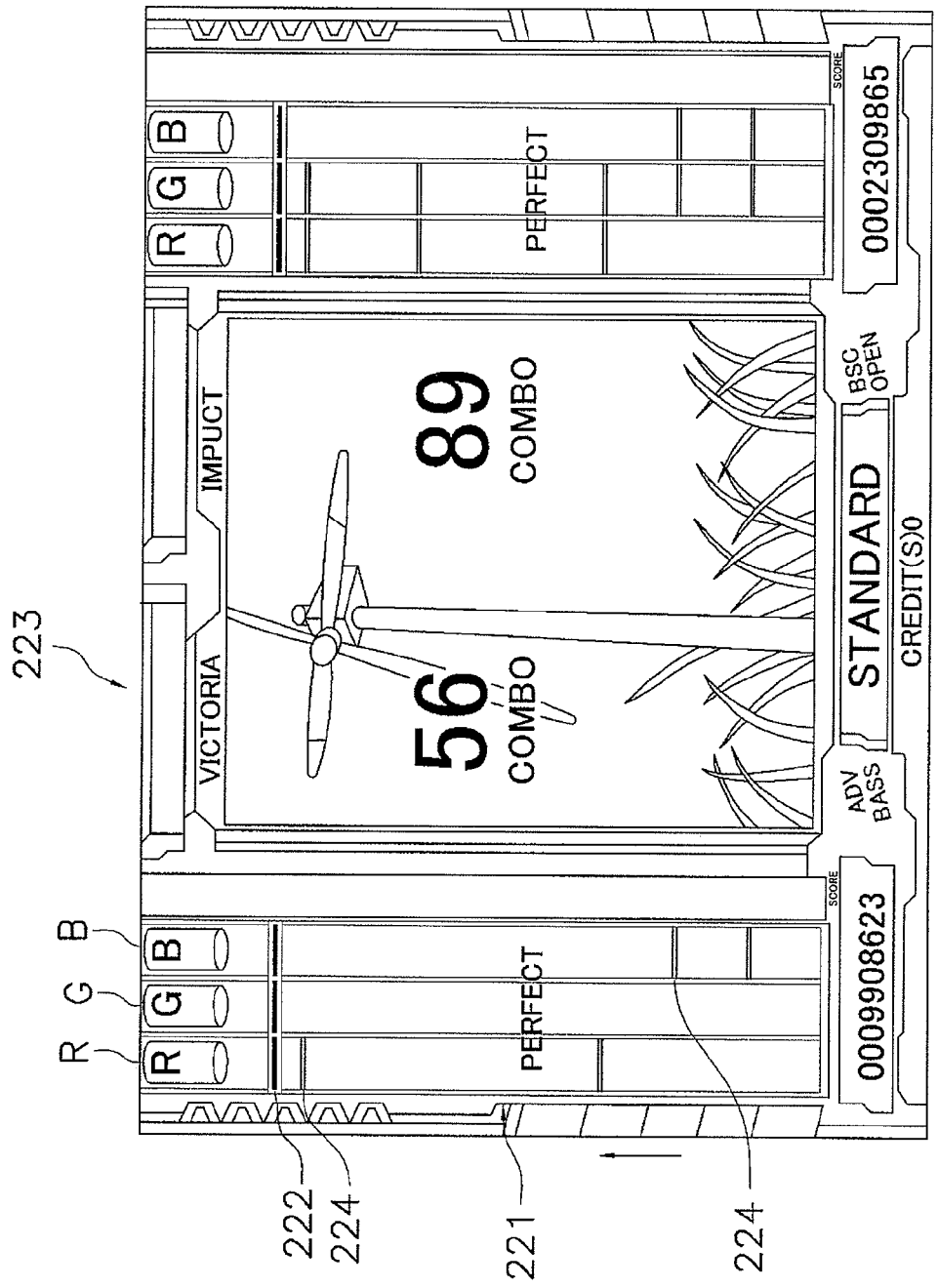
FIG. 6 is an explanatory diagram showing an example of a game screen.
Figure 7:
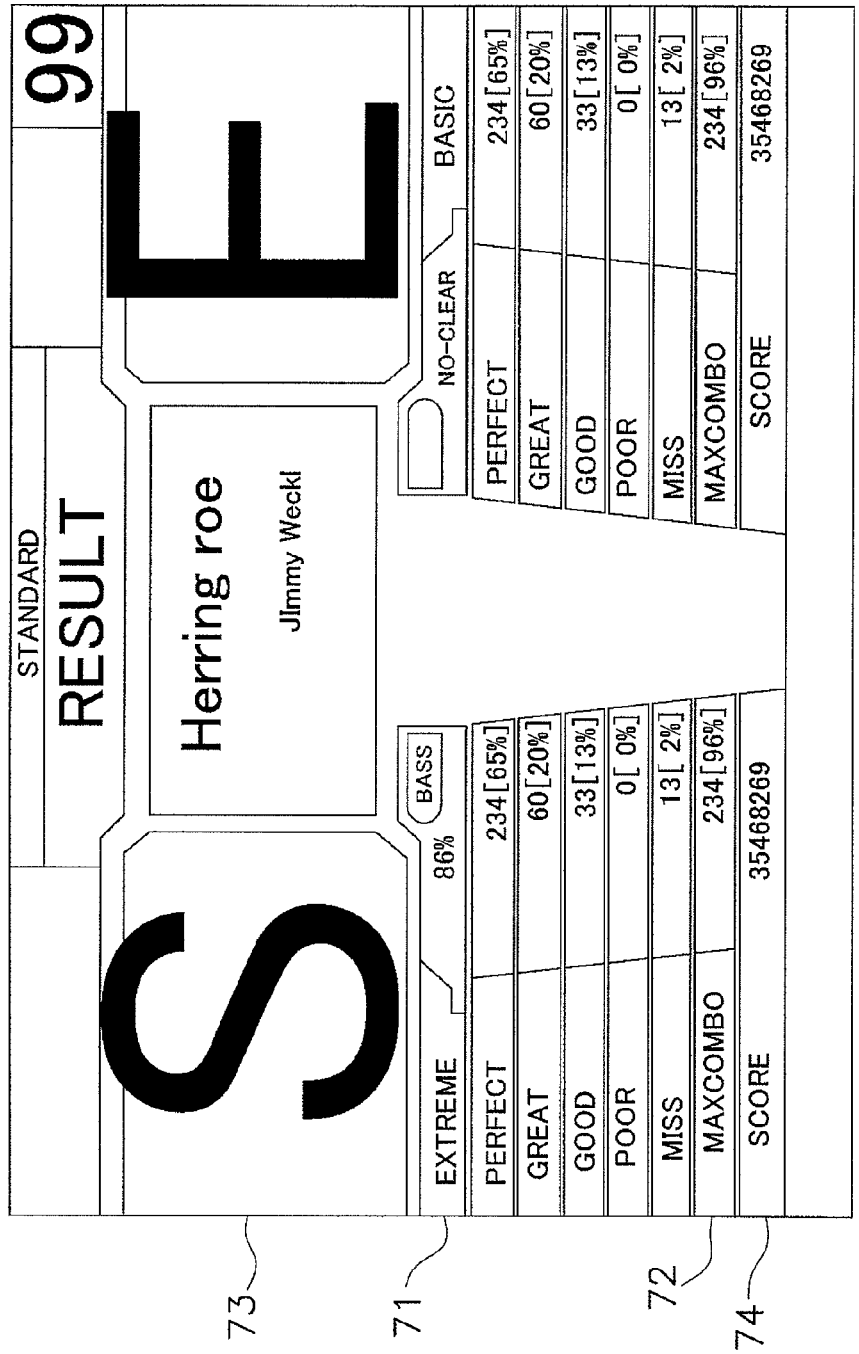
FIG. 7 is an explanatory diagram showing an example of the result screen when a music game is finished.

Next, an outline of the music game executed by the game terminal device 200 is explained, using FIGS. 5 through 7. FIG. 5 is an example of tune selection screen displayed on the monitor 206. The tune selection screen receives the selection of level of difficulty and tune from the player. In FIG. 5, the level of difficulty ("ADVANCED" in the figure) "36", and the tune name "NO MORE CRYING" are selected.

FIG. 6 is an example of game screen 223 displayed in the monitor 206. In this game, notes 224 indicating the operation timing for each rhythmic sound corresponding to each tune performed (BGM) are displayed in a notes display unit 221 for each rhythmic sound as shown in FIG. 6. The notes 224 move independently in sequence for each rhythmic sound in accordance with the progress of each tune in a direction (the upward direction in FIG. 6) towards a standard line 222 in the notes display unit 221. The time when the notes 224 coincide with the standard line 222 is the operation timing that the player should operate the picking input portion 211*b*-1. The player operates the neck buttons R, G, B with one hand, and operates the picking input portion 211*b*-1 and the changing switch 211*b*-2 with the other hand, in accordance with the rhythmic sound, while checking the position of the notes 224, to input operation signals.

The CPU 201 monitors the deviation between the operation timing and the operation signal input timing, and in accordance with whether the deviation is large or small displays "Perfect", "Great", "Good", "Poor", or "Miss" in the notes display unit 221, and in addition counts its frequency of occurrence. Based on these frequencies of occurrence, the CPU 201 determines the player's results for some or all of predetermined parameters. In this example, the parameters are the following seven parameters. However, the parameter types and numbers can be set in accordance with how the primary game is made.

(a) Skill point: Calculated in accordance with the frequency of occurrence of "Perfect", "Great", "Good", "Poor", or "Miss".

(b) Maximum combo number: The combo number is the interval between "Misses", and the maximum combo number is the maximum interval from among the intervals between misses that has occurred.

(c) Level of difficulty: This is the level of difficulty of the tune selected by the player (see FIG. 5).

(d) Remaining amount of life: Calculated by subtracting a predetermined value in accordance with the occurrence of "Misses".

(e) Rank: The rank that a player has.

(f) Number of "Perfects": The total number of "Perfects" while performing one tune.

(g) Score: Calculated based on the value of each of the parameters (a) through (f) and a predetermined calculation formula.

FIG. 7 shows an example of the results screen when the music game is completed. After completion of the game, the CPU 201 displays skill points 71 (in the figure "EXTREME" 86%), maximum combo number 72 (in the figure "MAX-COMBO" 234 (96%), rank 73 (in the figure "S"), score 74 (in the figure "SCORE" 35468269) and so on, in the monitor 206.

(3) Evaluation of the Game Result for the Secondary Game

Next, the evaluation of the game result for the secondary game is explained for the case where the present invention is applied to the music game as the primary game.

(3-1) Functional Constitution of the Center Server

Figure 8:
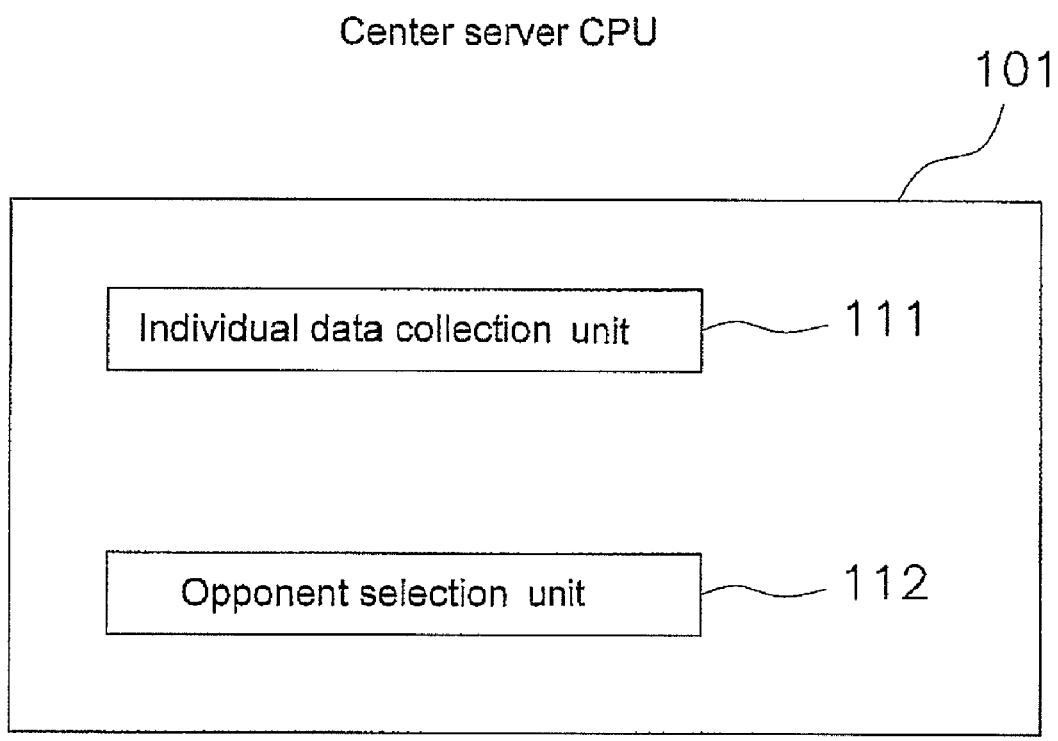
FIG. 8 is an explanatory diagram showing the functional constitution of the center server CPU.

FIG. 8 is an explanatory diagram showing the functional constitution of the CPU 101 of the center server 100. The CPU 101 includes individual data collection unit 111 and opponent selection unit 112. Before explaining these units, individual data is explained.

FIG. 9 is an outline explanatory diagram of the individual data. The individual data is stored in the data storage unit 105 of the center server 100. In this example, the individual data includes "player ID", "player name", "authorization information", "card ID", "rank", "parameter cumulative score", and "secondary game cumulative score" in one record. "Player ID" is identification information for identifying a player. "Player name" is name of a player. "Authorization information" is the password or secret number used for authorizing a player. "Card ID" is identification information for identifying a card possessed by a player. A card ID is recorded on each card. "Rank" indicates the rank of a player. In this example, every time a player wins the secondary game a predetermined number of times, the center server 100 revises the player's rank. "Parameter cumulative score" indicates the cumulative value (hereafter referred to as parameter cumulative score) of the result of each parameter in primary games that the player has played in the past. The cumulative value of each parameter may be the cumulative value for each parameter calculated for a particular type of primary game, or it may be the cumulative value of the parameter results evaluated in common with a different type of primary game or a different version of the primary game. "Secondary game cumulative score" indicates the total number of wins and losses respectively in the secondary game at a certain rank. When the rank is changed, the secondary game cumulative score is reset.

Referring again to FIG. 9, the function of the individual data collection unit 111 and the opponent selection unit 112 are explained. The individual data collection unit 111 receives individual data from each game terminal device 200, and updates the data storage unit 105. For example, if a certain player exceeds a predetermined number of wins in the secondary game, based on the results of the secondary game received from a game terminal device 200, the individual data collection unit 111 revises the individual data so that the player is promoted up by one rank.

The opponent selection unit 112 selects a secondary game opponent in response to a request from a game terminal device 200. When the opponent selection unit 112 receives a request that contains a player ID, the opponent selection unit 112 selects another player ID having the same rank as the player ID. The parameter cumulative score of the selected player ID is transmitted to the game terminal device 200 that is the source of the request by the individual data collection unit 111. After receiving it, the game terminal device 200 that is the source of the request executes the secondary game based on the parameter cumulative score.

(3-2) Functional Constitution of the Game Terminal Device

Figure 10:
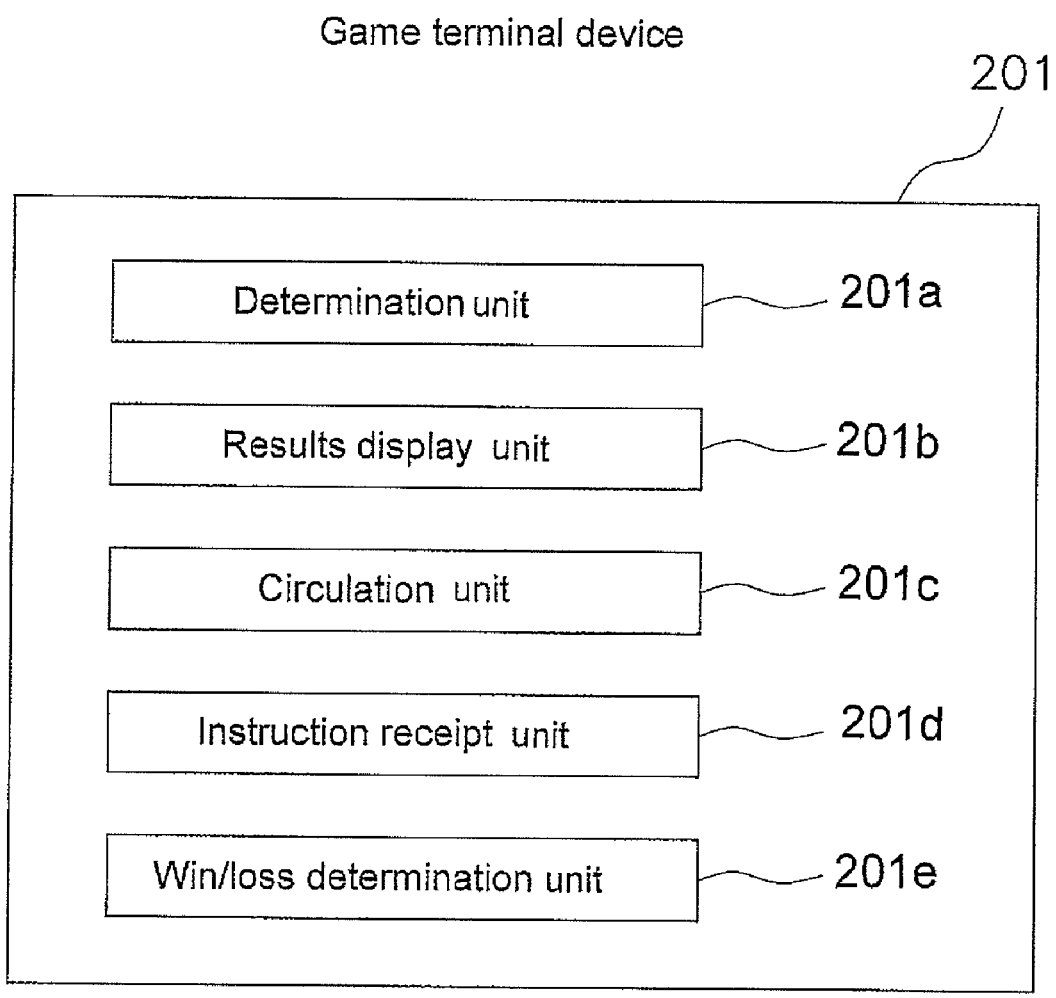
FIG. 10 is an explanatory diagram showing the functional constitution of the CPU of the game terminal device.

FIG. 10 is an explanatory diagram showing the functional constitution of the CPU 201 of the game terminal device 200. The CPU 201 includes determination unit 201*a*, results display unit 201*b*, circulation unit 201*c*, instruction receipt unit 201*d*, and win/loss determination unit 201*e*.

(3-2-1) Determination Unit

<Determination of Superiority and Inferiority>

After completion of a primary game by a player, the determination unit 201*a* requests and obtains the parameter cumulative score of the other player from the center server 100. The determination unit 201*a* adds the player's score for each parameter obtained in the primary game to the player's parameter cumulative score for each parameter, to update the player's parameter cumulative score. The determination unit 201*a* compares the revised parameter cumulative score and the parameter cumulative score of the other player, for each parameter. This comparison may be carried out for all the parameters evaluated in the primary game, or it may be carried out for only some of the parameters. Next, based on the comparison result, the determination unit 201*a* determines the superiority or inferiority of the player relative to the other player, for each parameter. The player's parameter cumulative score is downloaded from the center server 100 together with other data before the start of the primary game (see Step S4 in the main process described later).

Some or all of the parameters used in the primary game may be used as they are as comparison items for the secondary game, so the determination of superiority and inferiority may be carried out by comparing as they are the values of each of the parameters obtained in the primary game, but this is not necessarily the case. For example, a combination of the values of several of the parameters in the primary game may be used as comparison items for the secondary game. As an example, of the seven parameters in the music game described above in (2-3), six may be used, and the comparison items used in the secondary game can be determined as follows. In the following example, comparison item 1 is an example of combining two of the parameters of the primary game as the comparison item. Comparison items 2 through 6 are examples of using parameters of the primary game as they are as comparison items for the secondary game.

(Comparison item 1)=(Level of difficulty)+(skill points)
(Comparison item 2)=(Maximum combo number)
(Comparison item 3)=(Level of difficulty)
(Comparison item 4)=(Amount of remaining life)
(Comparison item 5)=(Number of "Perfects")
(Comparison item 6)=(Skill points)

In any case, the determination unit 201*a* obtains the values of the comparison items for the secondary game based on the parameter cumulative scores of the respective players, and compares them to determine the superiority and inferiority of the players for each comparison item. In other words, the determination unit 201*a* compares the player's score with the other player's score for each comparison item, based on the parameters from the primary game, and determines the superiority and inferiority of the players for each comparison item based on the comparison results. In other words, even if the number of parameter items of the player and the number of parameter items of the other player are different, it is possible to compete in the secondary game by calculating the values of the comparison items based on the scores for the parameters that are common to both. Also, the comparison and the determination of superiority and inferiority may be carried out based on the scores for some of the parameters that are common among the parameter cumulative scores of the player and the opponent. Therefore, even if the primary games played by the player and the opponent for the secondary game are different, it is possible to carry out the secondary game.

<Message Display>

Figure 11:
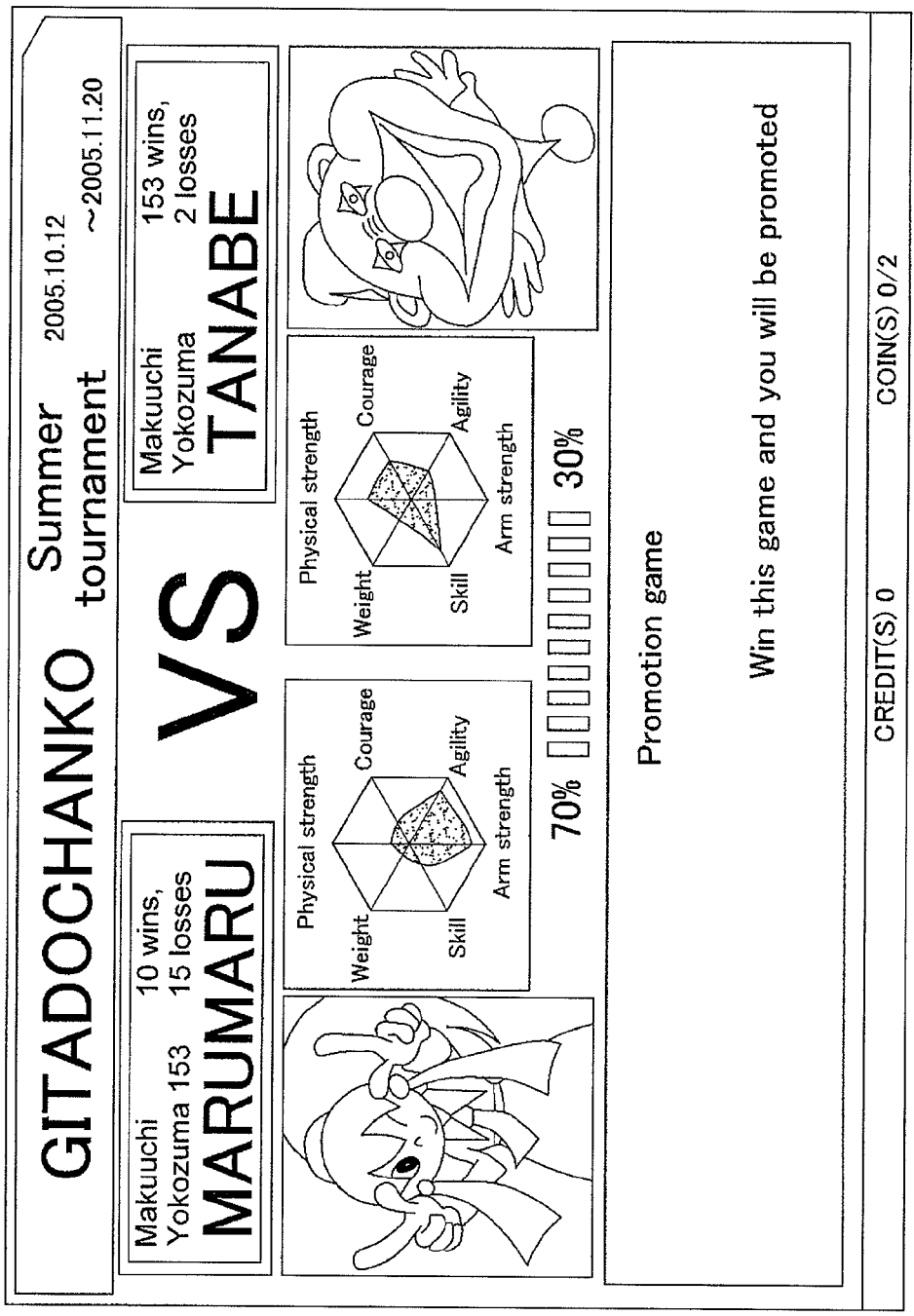
FIG. 11 is an explanatory diagram showing an example of a promotion game notification screen.

The determination unit 201a refers to the players' secondary game cumulative score, and if the number of wins reaches a predetermined number, a promotion game notification screen is output. For example, if the rank is increased every six wins, if the number of wins reaches five, a predetermined promotion game notification screen is output. FIG. 11 is an explanatory diagram showing an example of a promotion game notification screen. This screen makes the player aware that by winning the next secondary game, the player can be promoted.

(3-2-2) Results Display Unit

The results display unit 201b displays a competition screen on the monitor 206.

<Competition Screen>

Figure 12:
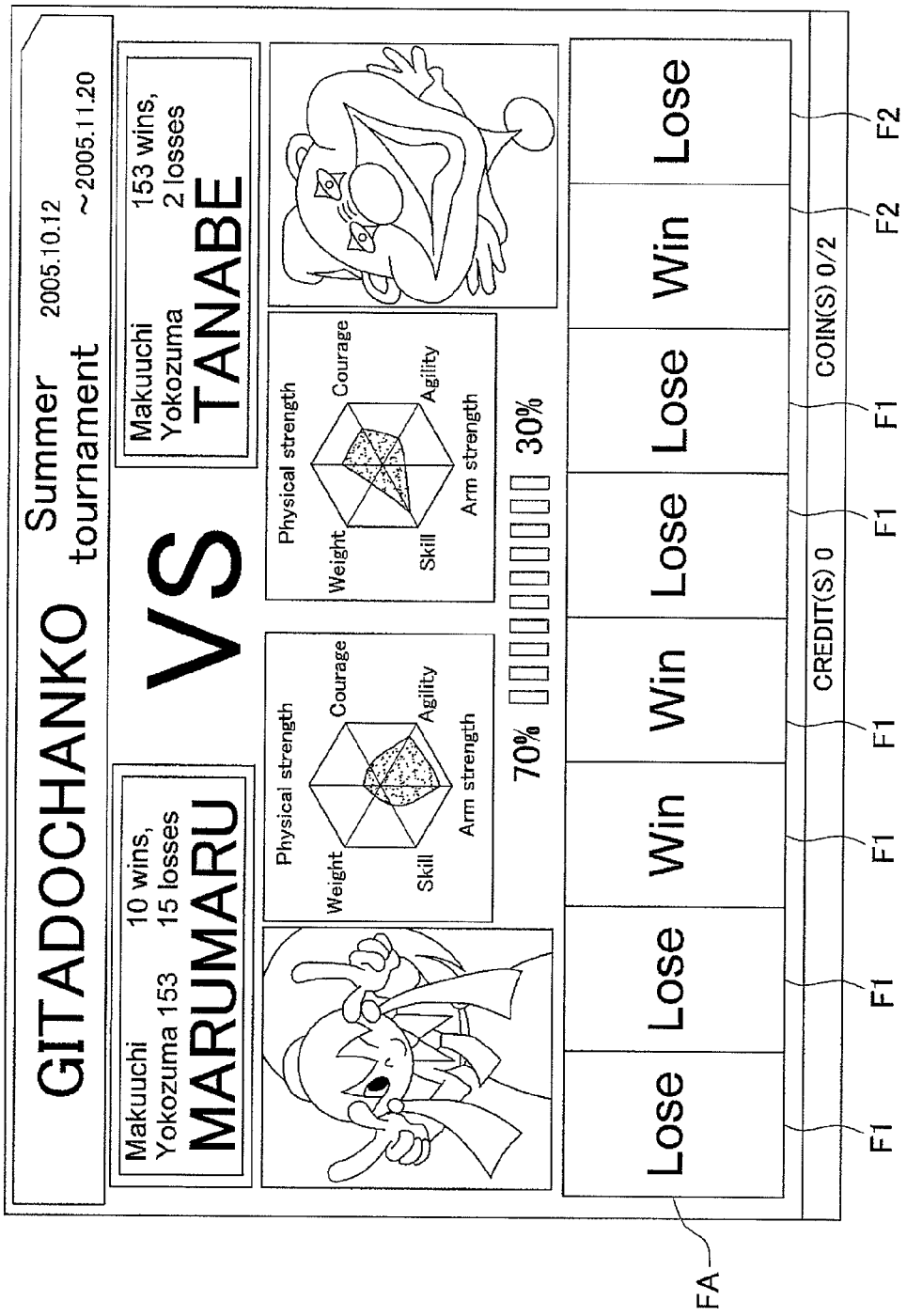
FIG. 12 is an explanatory diagram showing an example of a competition screen.

FIG. 12 is an explanatory diagram showing an example of a competition screen displayed by the results display unit 201b. In the competition screen, the results of the determination of superiority and inferiority for each comparison item calculated by the determination unit 201a are displayed in determined results fields F1 arranged in the horizontal direction of the screen. Each determined results field F1 corresponds to one of the parameters. In this example, the determined results are displayed as either of the values "Win" or "Lose". Starting from the determined results field F1 at the left hand end of the screen, the determined result is displayed for each of the comparison items "physical strength", "courage", "agility", "arm strength", "skill", and "weight".

The names of the comparison items used in the secondary game "physical strength", "courage", . . . may be the same as the names of the parameters used in the primary game "skill points", "maximum combo number", . . . , or they may be different.

<The Use of Two Values>

It is preferable that the results display unit 201b displays the determined results as one of two values. For example, it has been stated that the results display unit 201b displays the determined result as "Win" for comparison items for which it is determined that the player is superior to the other player, and conversely displays the determined result as "Lose" for comparison items for which it is determined that the player is inferior. By displaying the determined results as two values in this way, a player can easily see at a glance whether there are more "Wins" or "Losses", and can easily determine whether the player is in a favorable situation or not. Also, by using two values for the determined results, while a determined results field array FA and a reference mark RM, which are described later, are circulating, the player can easily aim for the timing that the reference mark RM is positioned at a "Win" field.

<Form of Display of the Determined Results Field>

The results display unit 201b may display the values of the two values in different display forms. For example, "Win" and "Lose" may be displayed in different colors respectively, so that a player can easily distinguish between "Win" and "Lose". Therefore a player can be given a chance of winning, and the competitive motivation of the players raised. Also, displaying the width or height of the "Win" fields larger than the "Lose" fields is possible.

<Display of Additional Fields>

The results display unit 201b may display the determined results fields F1 in a composite array to which fields having the same number of the each of the two values are added, as the determined results field array FA. In FIG. 12, a display example of the determined results field array FA is shown in which one each "Win" and "Lose" field F2 are added to the right end. By adding the additional fields F2 and displaying them, the following effect is obtained. In other words, even if a player has lost all the comparison items in the secondary game, if a predetermined number of both "Win" and "Lose" fields are added, the player is given a definite chance to win. In other words, by aiming for the "Win", the player can aim for a reversal in the secondary game at one stroke. This means that depending on the player's skill, the player can achieve a win by coming from behind in the secondary game. In other words, even a player with poor skill in the primary game has the possibility of winning in the secondary game by skillfully aiming for a "Win" in the secondary game.

Conversely, if a player achieves an excellent result in the primary game, the possibility of achieving "Win" in each comparison item in the secondary game is increased, so the chances of winning in the secondary game are increased. Therefore, players will give their best from the primary game stage, in order to increase the chances of winning in the secondary game. As a result, if a player gets a favorable determination result in the secondary game, the player can enjoy the feeling of satisfaction that their efforts in the primary game have been rewarded. Also, even if a player has all wins for all the comparison items, because the same number of "Win" and "Lose" fields are added, the likelihood of victory for the player in the secondary game is not 100%. In this way, it is possible to add interest as a game in the secondary game for players that have achieved excellent results in the primary game. The result of this is that the determination, appetite for promotion, and competitive spirit are stimulated up one level for both players with high skill and those without high skill. Incidentally, the reason "Win" and "Lose" are added in equal numbers is so that a player will not get the feeling that the game is unfair.

Also, unlike in FIG. 12, the determination results displayed in the competition screen does not necessarily have to display the additional fields F2. Also, the results display unit 201b may initially display the competition screen without displaying the additional fields F2, and subsequently add the display of the additional fields F2. In this way, the determined results for each comparison item are communicated to the players, and the players can be notified that the additional fields F2 have been provided.

(3-2-3) Circulation Unit

The circulation unit 201c moves the display position of either one or both of the determined results field array FA and the specific reference mark RM along the direction of alignment of the determined results field array FA. In this way, the determined results field array FA is circulated relative to the reference mark RM. The additional fields F2 as described previously may also be included in the determined results field array FA.

<Circulation of the Determined Results Field Array>

Figure 13A:
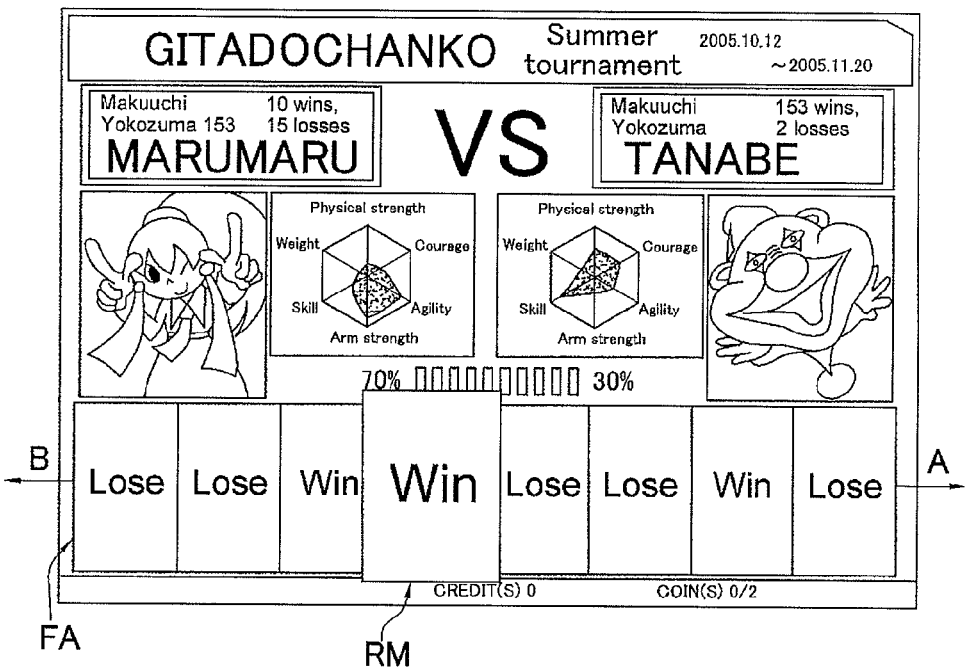
FIG. 13A is an explanatory diagram for the circulation of the determined results field array (FA)

FIG. 13A is a diagram for explaining the circulation of the determined results field array (FA). The procedure for the circulation of the determined results field array FA is as follows. The circulation unit 201c shifts the position of each field in the determined results field array FA in the direction of alignment of the fields (direction A or direction B in the figure) by a fixed distance, and then re-displays them. By repeating this, the field position corresponding to each parameter is circulated. For example, each determined results field F1 is shifted in the direction A (to the right in the figure) shown in the figure, and when a field reaches the right end it is moved to the left end, and again shifted towards the right end. The amount shifted may be a predetermined number of dots, or it may be the width of one field. By repeating this, the horizontal array of the determined results field array FA circulates to the right at a constant velocity. When the determined results field array FA is circulated, the reference mark RM may be fixed in a fixed position, for example at the position of the fourth field from the left, or the reference mark RM may be circulated along the determined results field alignment direction as described later. The circulation direction may be switched at predetermined time intervals.

<Circulation of the Reference Mark>

Figure 13B:
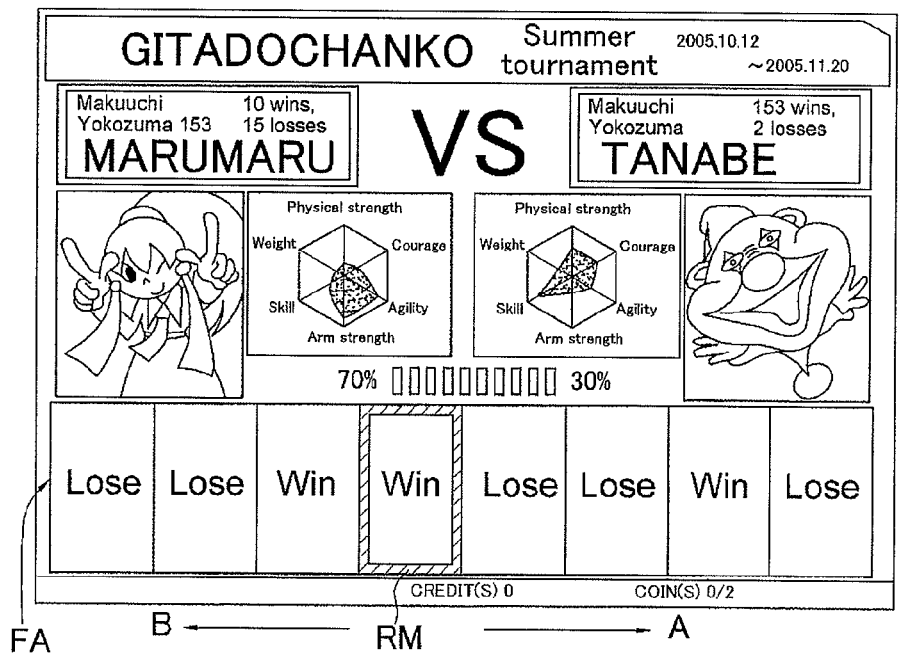
FIG. 13B is an explanatory diagram for the circulation of the reference mark RM.

FIG. 13B is a diagram for explaining the circulation of the reference mark RM. The circulation unit 201c can circulate the reference mark RM at a constant speed by repeatedly shifting the position of the reference mark RM in the determined results field array FA in the direction of alignment of the determined results fields F1 (direction A or direction B in the figure) by a fixed distance each time, and then re-displaying the reference mark RM. The amount shifted may be a predetermined number of dots, or it may be the width of one field. For example, in FIG. 13B, if the reference mark RM is shifted by the amount of one field in the direction A (the right direction in the figure) every time, when the reference mark RM reaches the right end it is moved to the left end, and is again shifted towards the right end one field at a time. By repeating this, the reference mark RM circulates to the right along the determined results field array FA which is aligned horizontally. At this time, the determined results field array FA may be stopped, or it may be circulated along the determined results field alignment direction. Provided the reference mark RM is a mark that identifies one of the fields of the determined results field array FA, there is no particular limitation. For example, an emphasis mark or lamp to emphasize a certain field, or a certain field can be displayed as enlarged, and so on, can be used.

<Circulation of the Determined Results Field Array and the Reference Mark>

If both the reference mark RM and the determined results field array FA are circulated, the circulation direction of the reference mark RM may be the same or the opposite direction to the circulation direction of the determined results field array FA. However, if both the determined results field array FA and the reference mark RM are circulated in the same direction, the circulation speeds of the two are adjusted so that the circulation speeds are not the same. By doing this, the reference mark RM and the determined results field array FA each circulate relative to the other, with a constant relative circulation speed. If the relative circulation speed is constant, a player can easily aim for a determined result that is favorable.

<Circulation of an Array that Includes Additional Fields>

As shown in FIGS. 13A and 13B, the circulation unit 201c may circulate a determined results field array FA containing additional fields F2. The determined results field array FA containing additional fields and the reference mark RM each circulate relative to the other.

<Others>

The direction of circulation of the determined results field array FA and the reference mark RM is varied in accordance with the form of alignment of the determined results fields F1.

For example, if the determined results fields F1 are aligned in the shape of a ring, the direction of circulation is either clockwise or counterclockwise. Also for example, if the determined results fields F1 are aligned in a vertical column, the direction of circulation is either from top to bottom or the opposite.

Also, it is preferable that the relative circulation speed of the determined results field array FA and the reference mark RM is such that a player can aim for a "Win" field, and also the player cannot achieve 100 out of 100. For example, in the case where the determined results field array FA includes six determined results fields F1 and two additional fields as shown in FIG. 13, the determined results field array FA should preferably circulate at a speed in the range of 0.1 to 0.5 seconds per cycle. However, the circulation speed varies depending on various factors, such as the size of each field, the size of the monitor 206, the form of the determined results display, and so on.

(3-2-4) Instruction Receipt Unit

Figure 14:
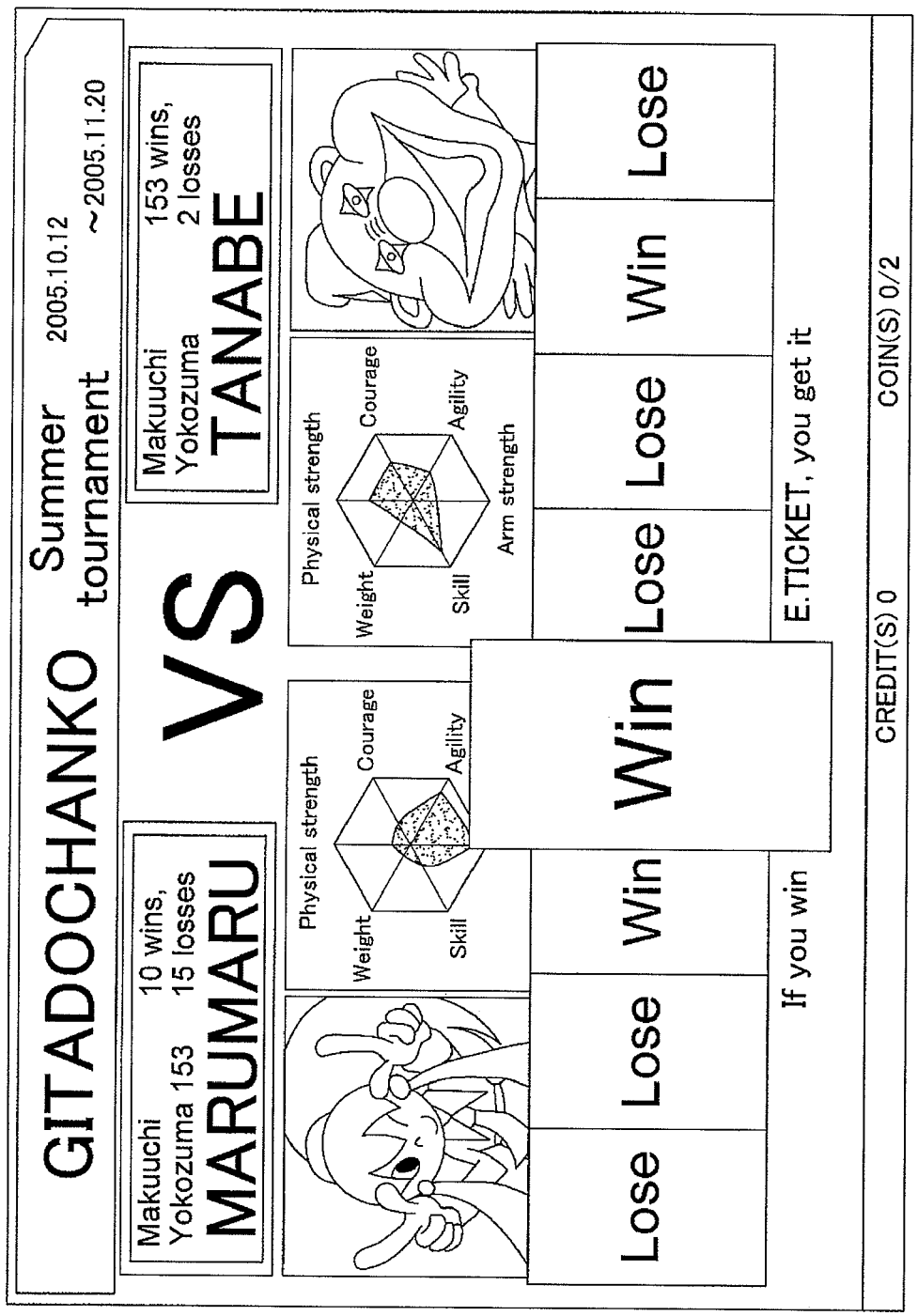
FIG. 14 is an explanatory diagram showing an example of secondary game results screen.

The instruction receipt unit 201d receives instructions from a player regarding the timing that the reference mark RM is positioned at any of the determined results fields F1, while the determined results field array FA and the reference mark RM are circulating. The instruction receipt unit 201d receives instructions and displays the secondary game results screen with the circulation stopped. FIG. 14 is an example of a secondary game results screen with the circulation stopped after receipt of an instruction from a player. In this example, the reference mark RM is displayed as an enlarged display of a determined results field F1, and the reference mark RM is positioned at a "Win" field which is fourth from the left.

(3-2-5) Win/Loss Determination Unit

The win/loss determination unit 201e determines whether a player has won or lost in the secondary game, in accordance with the value of the determined result field F1 at the position of the reference mark RM at the timing specified by the player. In the example in FIG. 14, the reference mark RM is positioned at a "Win" field, so it is determined that the player has won the secondary game. Further, the win/loss determination unit 201e transmits to the center server 100 the results for each parameter in the primary game completed before starting the secondary game, and the win or lose results of the secondary game.

(4) Flow of the Process (4-1) Flow of the Main Process

Figure 15:
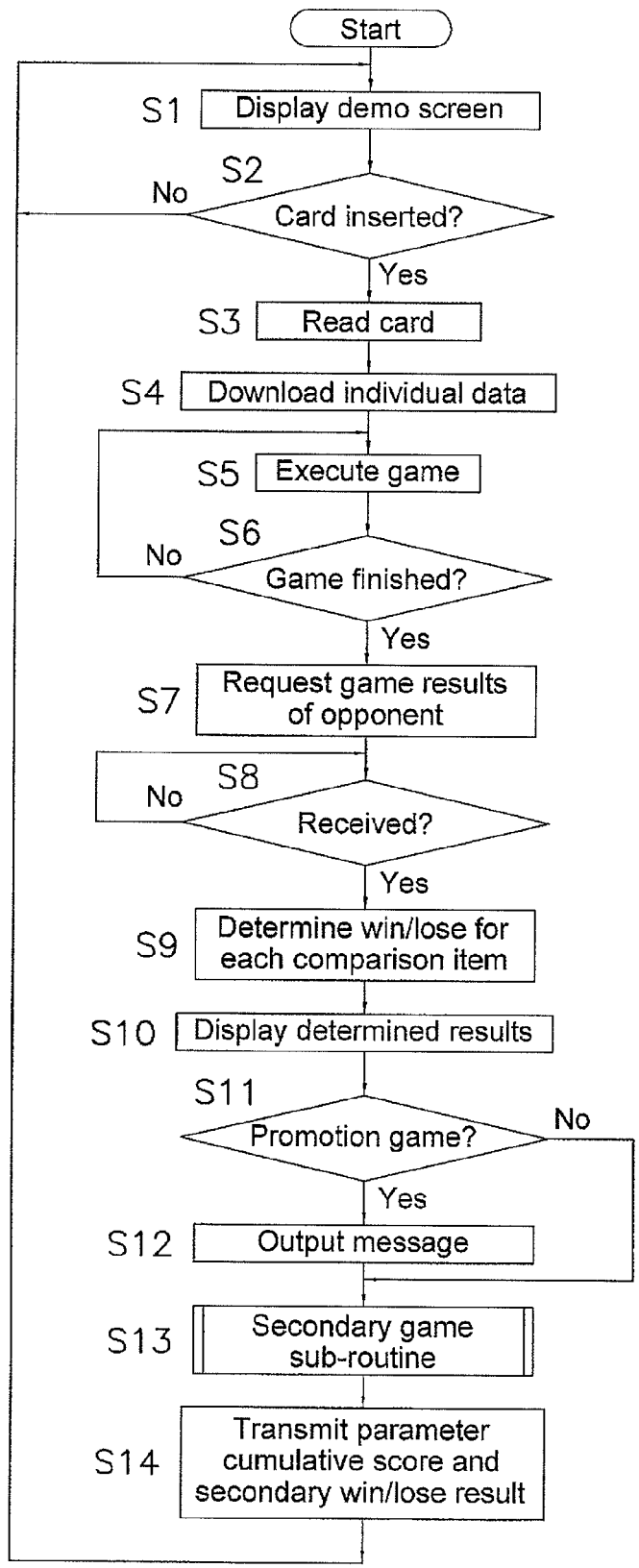
FIG. 15 is a flowchart showing an example of the flow of the main process carried out by the game terminal device.

FIG. 15 is a flowchart showing an example of the flow of the main process carried out by the game terminal device 200. When the electrical power to the game terminal device 200 is turned on, the following process is started.

Steps S1-2: The CPU 201 displays a demo screen while waiting for an instruction to execute a game (S1). For example, when a coin is inserted, or a magnetic card is inserted into the card reader/writer 212, the procedure moves to Step S3.

Step S3: The CPU 201 obtains the card ID that the card reader/writer 212 has read.

Step S4: The CPU 201 transmits the card ID that has been read to the center server 100, and downloads individual data corresponding to the card ID. The downloaded individual data includes authorization information, parameter cumulative scores, and secondary game cumulative results. Next, the CPU 201 requests the player to input authorization information, such as a password, or the like. The CPU 201 confirms whether the player is the person corresponding to the card ID by comparing the input authorization information with the authorization information included in the individual information.

Step S5: The CPU 201 executes the primary game. Execution of the game is carried out independently from this process.

Steps S6-S7: When the primary game is finished (S6), the CPU 201 selects the opponent for the secondary game, and requests the parameter cumulative scores for the opponent from the center server 100 (S7). The card ID is included with the request. After receiving the request, the CPU 101 of the center server 100 selects as the opponent another player of the same rank as the player, and transmits the parameter cumulative scores of the opponent to the game terminal device 200.

Steps S8-S10: When the CPU 201 receives the parameter cumulative scores of the opponent from the center server 100 (S8), the CPU 201 obtains the results for each comparison item in the secondary game for both the player and the opponent, and determines the superiority or inferiority of the player for each comparison item (S9). The determined results are displayed in the competition screen (S10).

Steps S11-S12: The CPU 201 determines whether to output a promotion game notification or not based on the number of wins contained in the secondary game cumulative results received from the center server 100 in Step S4. For example, if the rank is increased every six wins, and if the number of wins has reached five, the CPU 201 determines a "Yes", the promotion game notification screen is output, and after a predetermined period of time has passed the procedure moves to Step S13. If the CPU 201 determines a "No", the procedure moves to Step S13.

Step S13: The CPU 201 executes a secondary game sub-routine, which is described later, and determines the win or lose result of the secondary game.

Step S14: The CPU 201 transmits the latest parameter cumulative scores that reflect the result of the primary game that has been executed, and the win or lose results of the secondary game to the center server 100. The center server 100 updates the secondary game cumulative results based on the received data. If the number of wins in the secondary game cumulative results has reached a predetermined number, the rank is updated and the secondary game cumulative results are reset. Then the procedure returns to Step S1, and waits to start the next game. This process is terminated when the power to the game terminal device is turned off.

(4-2) Secondary Game Sub-Routine

Figure 16:
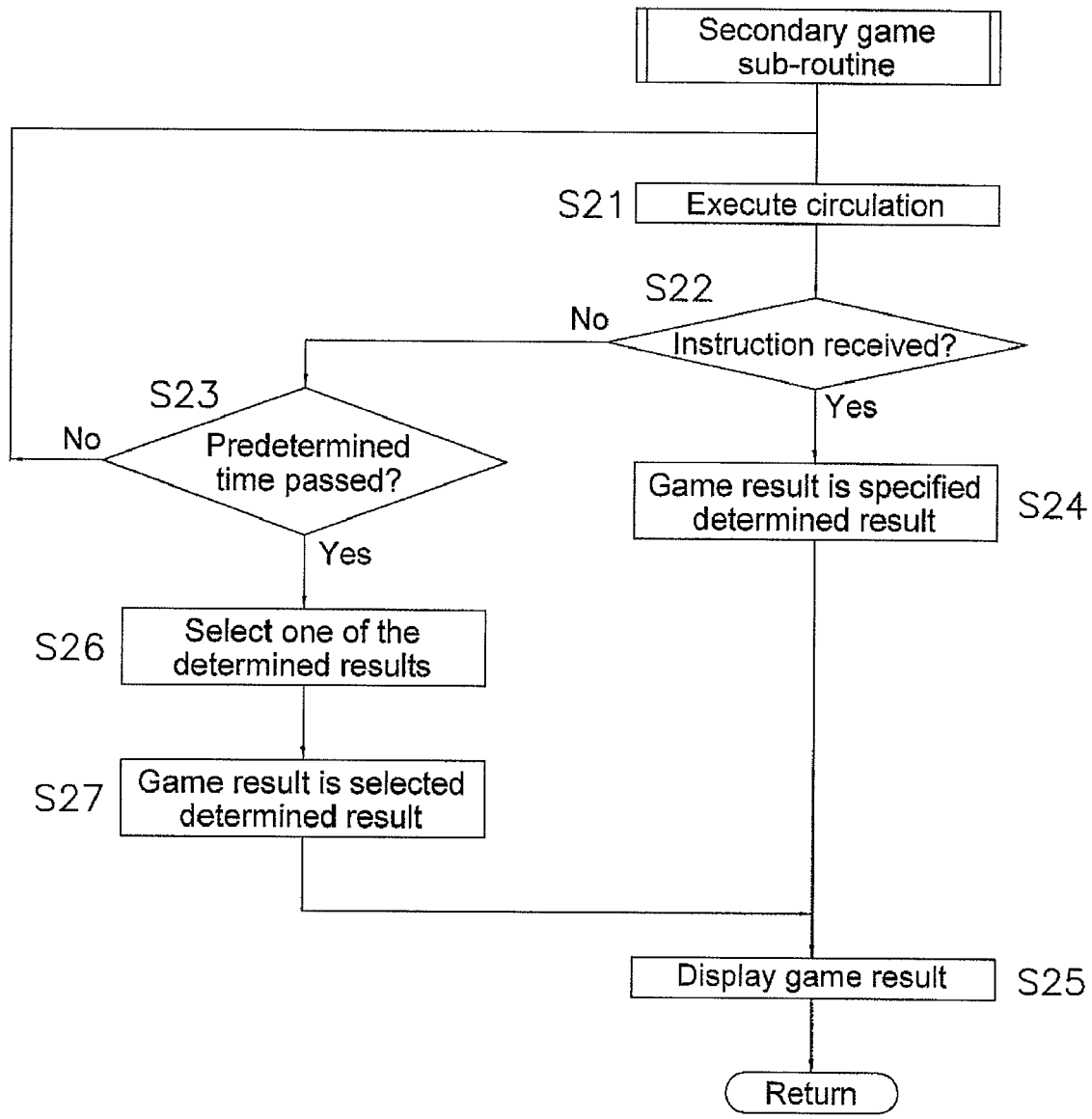
FIG. 16 is a flowchart showing an example of the flow of the secondary game sub-routine process.

FIG. 16 is a flowchart showing an example of the flow of the secondary game sub-routine process. In the main process as described previously, when the process moves to Step S13, the following process is started.

Step S21-S23: The CPU 201 circulates the determined results field array FA and the predetermined reference mark RM, which are displayed in the competition screen, relative to each other (S21). To simplify the explanation, consider the case where the reference mark RM is fixed, and the determined results field array FA circulates. While the determined results field array FA is circulating, the CPU 201 waits for an instruction from the player until a predetermined period of time has passed (S22, S23).

Steps S24-S25: When the CPU 201 receives a timing instruction from the player (S22), the result of the secondary game is the value of the determined results field F1 at which the reference mark RM is positioned at that time. Also, the CPU 201 stops the circulation of the determined results field array FA at the time of the instruction from the player, and displays the secondary game results screen (S25).

Step S26: If a timing instruction is not received from the player after a predetermined period of time has passed after start of circulation of the determined results field array FA, the CPU 201 selects one of the determined results fields F1 (S26), and the value of that field is displayed as the result of the secondary game (S27, S25).

The result of the secondary game determined by this sub-routine is transmitted to the center server 100 in the main process.

(5) Effect

In the present game result evaluating method, the results of the primary game of two players are compared for each parameter evaluated in the primary game, such as a music game or the like. More specifically, the values of the comparison items used in the secondary game are based on the parameters evaluated in the primary game. Whether a player wins or loses in the secondary game is determined based on the values of these comparison items, so in determining the win or loss in the secondary game, a player's results in the primary game are indirectly evaluated. Moreover, in determining the winner and loser based on the results of the determination of superiority and inferiority, it is clear to the players that there is not even a small amount of intervention by the computer. Therefore, the players can readily accept the win or loss in the secondary game. Furthermore, even if just looking at the determination results based on the comparison items shows many defeats, a player can aim for a favorable determination result by using their skill. This is because the incentive of "reward for the effect of effort" is given to the player. For example, even when there is only one "Win" item among N parameters, a player that is successful in targeting the one "Win" can win the secondary game. Conversely, there is a high possibility that a player with a good result in the primary game will have many "Wins" in the determination results, so it is possible to increase the success rate in the secondary game.

Also, by carrying out the secondary game after the primary game, it is possible to provide the player an added value that is not limited to simply evaluating the results of the player in the primary game, in other words the enjoyment of a separate game.

In this way, for players of all skills, winning or losing in the secondary game does not depend on the game device, but there is scope for determining the result by their own skill, so the players can accept the results obtained. On the other hand, winning or losing in the secondary game is a reflection of both the player's results in the primary game and the players' skill in the secondary game, so the result is that both the motivation in the primary game, which is necessary for the secondary game, and interest in the secondary game are stimulated.

Other Embodiment Examples (A) The form of display of the determined results field array FA is not limited to the example shown in FIG. 12, but various other forms can be considered. For example, the determined results fields F1 may be aligned in the shape of a ring. Also for example, the determined results field array FA may be aligned in a vertical row or in a slanted direction. As a further example, the determined results field array FA does not necessarily have to be arranged in a single direction, and an N-shape or U-shape may be used. In other words, there is no particular limitation as long as the determined results field array FA is in a form that can circulate.

Figure 17A:
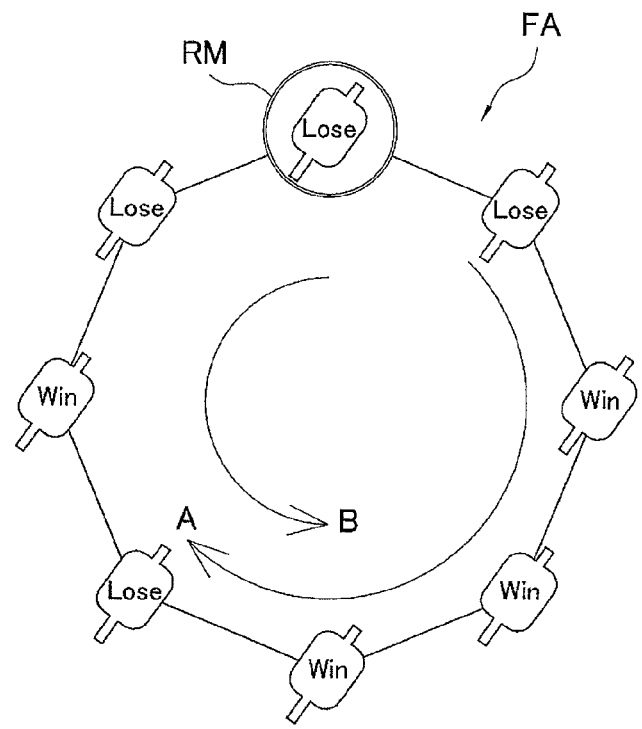
FIG. 17 is an explanatory diagram showing another form of arrangement of the determined results fields F1.
Figure 17B:
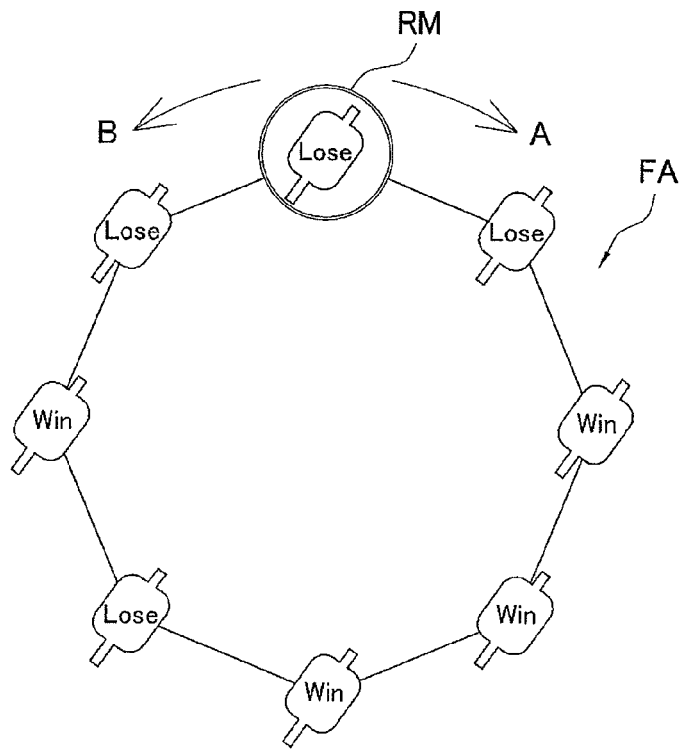

FIG. 17 shows another form of arrangement of the determined results fields F1. In this example, the determined results fields F1 are arranged in a ring shape. Also, the reference mark RM is shown with a shape that is similar to the referee's fan in sumo. In (a) in this figure, the reference mark RM is fixed, and the determined results fields F1 rotate either clockwise or counterclockwise. In (b) in this figure, the reference mark RM rotates either clockwise or counterclockwise.

Also, as a separate example, the determined results fields F1 can have a shape that imitates the slots of a roulette wheel used in roulette, and the slots corresponding to a "Win" field can be displayed with a red colored background, and the slots corresponding to a "Lose" field can be displayed with a black background. However, the number of slots is not 38, but is the number of parameters used in the primary game, or the number obtained by adding the number of additional fields to the number of parameters. In this case, the reference mark which imitates the roulette ball may be displayed in a fixed position within the wheel, or displayed as circulating in a constant direction within the wheel. In this way, various forms of arrangement and circulation direction may be considered for the determined results fields F1.

(B) In the first embodiment described above, the primary game was a music game, however the primary game is not limited to a music game. As long as a game evaluates a player with respect to at least one parameter, the game may be used as the primary game. Other examples of primary games include a nurturing game, a soccer game, and a simulation game.

(C) The program for executing the method as described above on a computer, and the recording medium on which the program is recorded so that the program can be read by a computer are included within the scope of the present invention. Here, the program may be a downloadable program. The recording medium can be a flexible disc capable of being read and written to by a computer, a hard disc, semiconductor memory, CD-ROM, DVD, opto-magnetic disc (MO), and so on.

While only selected embodiments have been chosen to illustrate the present invention, it will be apparent to those skilled in the art from this disclosure that various changes and modifications can be made herein without departing from the scope of the invention defined in depended claims. Furthermore, the detailed descriptions of the embodiments according to the present invention provided for illustration only, and not for the purpose of limiting the invention as defined by the present claims and specifications.

INDUSTRIAL APPLICABILITY

The game result evaluating method according to the present invention may be applied to the evaluation of the game results for all types of games based on predetermined evaluation items.

The invention claimed is:

1. A method for operating a gaming system that includes a central server and at least a first game device in communication with the central server, the first game devices having an electronic display the method comprising the steps of:

executing a game on the first game device played by a first player producing game result that includes a plurality of evaluation items based on the game playing performance of the first player;

providing from the central server a second player's game results to the first game device, the second player's game results including a plurality of evaluation items based on previous game playing performances of the second player;

comparing the evaluation items of the first player's game results with corresponding ones of the evaluation items of the second player's game results, and determining the superiority and inferiority of the first and second players for each of the evaluation items thereby producing a plurality of determined results;

displaying on the display of the first game device a reference mark and a plurality of images, each image representing a corresponding one of the plurality of determined results, the images being arranged along a predetermined direction on the display;

providing movement on the display by changing the position of the reference mark relative to the images representing the determined results, or by changing the position of the images representing the determined results relative to the reference mark, such that the reference mark points to only one image at any given time while the reference mark and the images are being displayed with the provided movement;

receiving from the first player an instruction indicating the first player has selected of the one of the images that the reference mark points to at the time the instruction is received; and determining whether the first player has won or lost relative to the second player, in accordance with the image selected by the first player.

2. The method according to claim 1, wherein
the displaying on the display includes positioning of the images representing the determined results in a circular arrangement and repeatedly shifting the position of the images of the determined results around the circular arrangement.

3. The method according to claim 1, wherein
the displaying on the display includes displaying the images representing the determined results in a side-by-side linear arrangement and
the providing of movement includes moving the reference mark relative to the linear arrangement of the images representing the determined results.

4. The game result evaluating method according to claim 1, wherein
the displaying on the display includes displaying the images of the determined results as one of either a first value or a second value.

5. The method according to claim 1, wherein
the displaying on the display includes displaying the each image representing one of the determined results as one of either a first value or a second value, displaying the first value and the second value in equal numbers.

6. The method according to claim 4, wherein
the displaying on the display includes displaying the first value in a first display format and displaying the second value in a second display format different from the first display format.

7. The method according to claim 1, further comprising the step of
providing communication between the central server and a plurality of different game devices.

8. The method according to claim 7, wherein
the plurality of different game devices include one or more game devices selected from the following: personal computers, mobile telephones and game terminal devices.

9. The method according to claim 1, wherein
the compared evaluation items include skill point, maximum combo number, level of difficulty, remaining amount of life, rank, number of Perfects and score.

10. The according to claim 4, wherein
the first value corresponds to a WIN for the first player and the second value corresponds to a LOSE for the first player.

11. A method for operating a gaming system that includes a central server and at least a first game device in communication with the central server, the first game devices having an electronic display, the method comprising the steps of:
executing a game on the first game device played by a first player producing game result that includes a plurality of evaluation items based on the game playing performance of the first player;
providing from the central server a second player's game results to the first game device, the second player's game results including a plurality of evaluation items based on previous game playing performances of the second player;
comparing the evaluation items of the first player's game results with corresponding ones of the evaluation items of the second player's game results, and determining the superiority and inferiority of the first and second players for each of the evaluation items thereby producing a plurality of determined results;
displaying on the display of the first game device a reference mark and a plurality of images, each image representing a corresponding one of the plurality of determined results, the images being arranged along a predetermined direction on the display;
providing movement on the display by changing the position of the reference mark relative to the images representing the determined results such that the reference mark points to only one image at any given time while the reference mark and the images are being displayed with the provided movement;
receiving from the first player an instruction indicating the first player has selected of the one of the images that the reference mark points to at the time the instruction is received; and
determining whether the first player has won or lost relative to the second player, in accordance with the image selected by the first player.

12. The method according to claim 11, wherein
the displaying on the display includes positioning of the images representing the determined results in a circular arrangement.

13. The method according to claim 11, wherein
the displaying on the display includes positioning of the images representing the determined results in a linear arrangement.

14. A method for operating a gaming system that includes a central server and at least a first game device in communication with the central server, the first game devices having an electronic display, the method comprising the steps of:
executing a game on the first game device played by a first player producing game result that includes a plurality of evaluation items based on the game playing performance of the first player;
providing from the central server a second player's game results to the first game device, the second player's game results including a plurality of evaluation items based on previous game playing performances of the second player;
comparing the evaluation items of the first player's game results with corresponding ones of the evaluation items of the second player's game results, and determining the superiority and inferiority of the first and second players for each of the evaluation items thereby producing a plurality of determined results;
displaying on the display of the first game device a reference mark and a plurality of images, each image representing a corresponding one of the plurality of determined results, the images being arranged along a predetermined direction on the display;
providing movement on the display by changing the position of the images representing the determined results relative to the reference mark such that the reference mark points to only one image at any given time while the reference mark and the images are being displayed with the provided movement;
receiving from the first player an instruction indicating the first player has selected of the one of the images that the reference mark points to at the time the instruction is received; and
determining whether the first player has won or lost relative to the second player, in accordance with the image selected by the first player.

15. The method according to claim 14, wherein
the displaying on the display includes positioning of the images representing the determined results in a circular arrangement.

16. The method according to claim 14, wherein
the displaying on the display includes positioning of the images representing the determined results in a linear arrangement.

* * * * *